No. 770,791. PATENTED SEPT. 27, 1904.
W. E. ANDREW.
VEHICLE TIRE.
APPLICATION FILED MAR. 25, 1903.
NO MODEL. 2 SHEETS—SHEET 1.
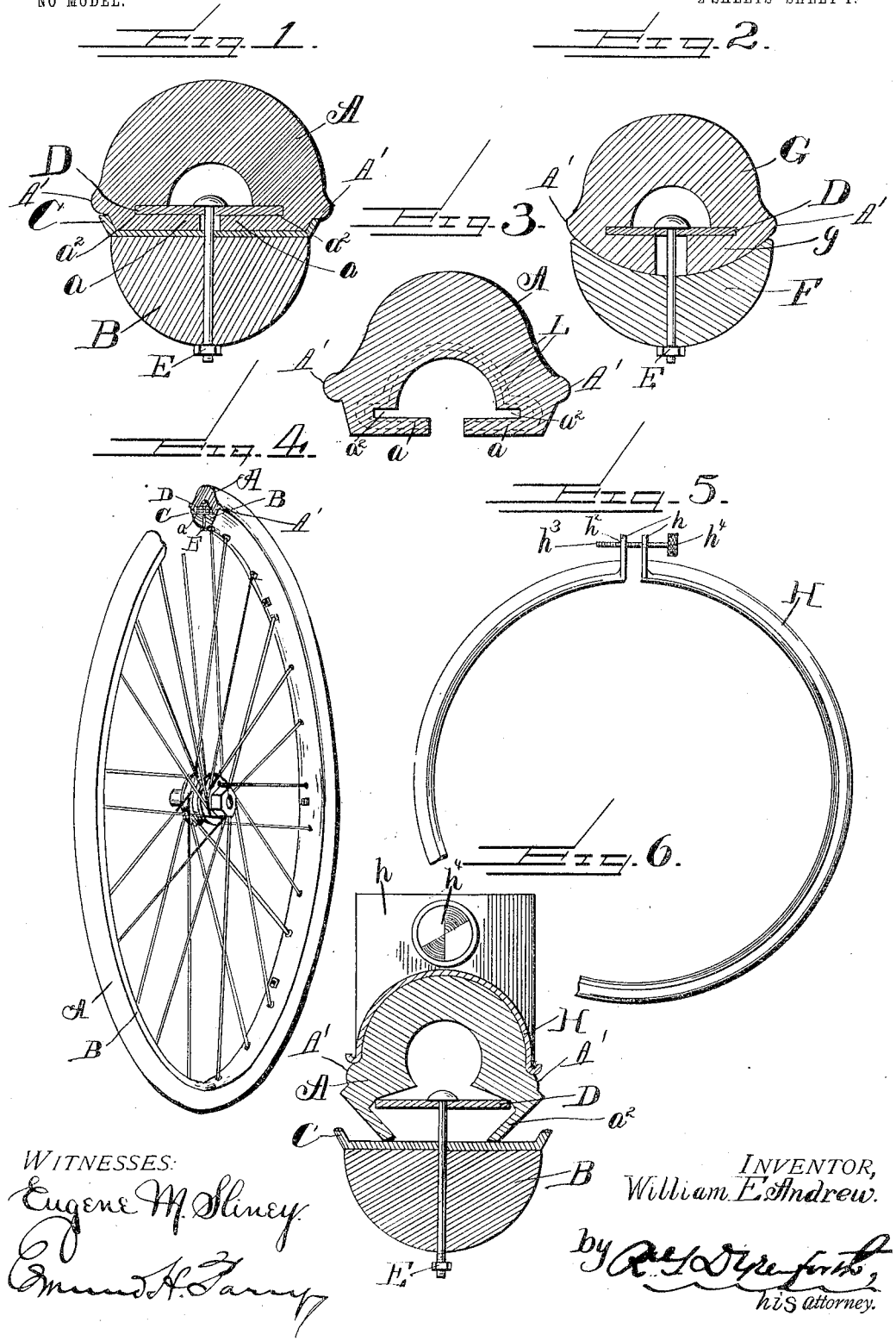
WITNESSES:
Eugene M. Sliney
Edmund H. Parry
INVENTOR,
William E. Andrew.
by R. S. Dyrenforth,
his Attorney.

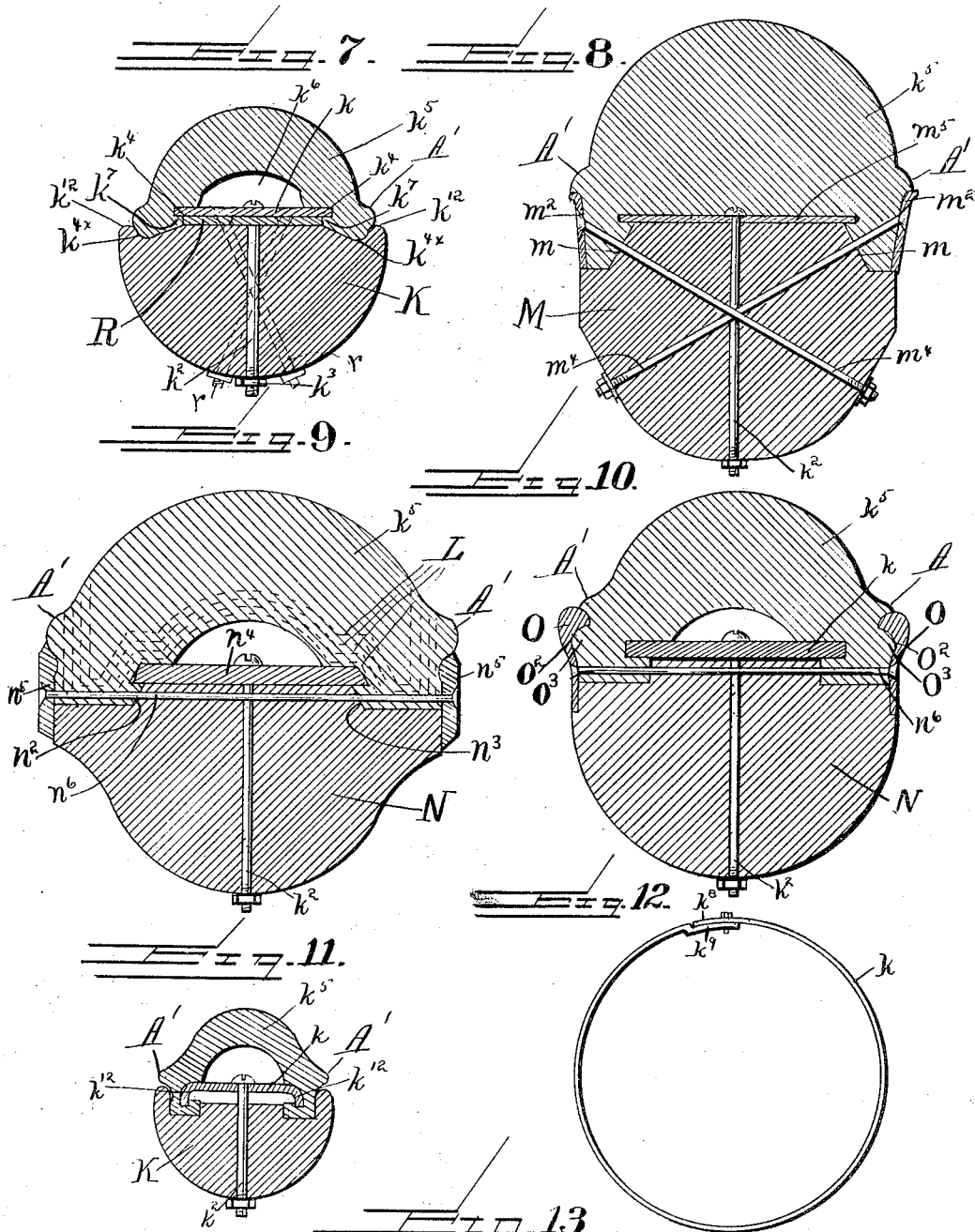

No. 770,791.

Patented September 27, 1904.

UNITED STATES PATENT OFFICE.

WILLIAM E. ANDREW, OF ATLANTIC HIGHLANDS, NEW JERSEY.

VEHICLE-TIRE.

SPECIFICATION forming part of Letters Patent No. 770,791, dated September 27, 1904.

Application filed March 25, 1903. Serial No. 149,526. (No model.)

*To all whom it may concern:*

Be it known that I, WILLIAM E. ANDREW, a citizen of the United States, residing at Atlantic Highlands, in the county of Monmouth and State of New Jersey, have invented certain new and useful Improvements in Automobile and other Vehicle Tires; and I do hereby declare the following to be a full, clear, and exact description of the invention, such as will enable others skilled in the art to which it appertains to make and use the same.

The object of this invention is to provide an improved form of resilient tire or tread member for automobiles, bicycles, and various forms of vehicles, such as can readily and easily be applied, if desired, to an ordinary wheel by slight alteration.

A further object is to provide a form of tire that will effectually resist undue compression in use and which will have the resiliency, durability, and effect of pneumatic tires without having the disadvantage of the latter form of tire of inflation and liability to puncture and rupture and then being incapacitated for use.

A further object is to provide means for securing the tire to the felly or rim of a vehicle-wheel in use.

With these objects in view and others my invention comprises the construction, arrangement, and combination of parts, as hereinafter described and claimed.

In the accompanying drawings, forming a part of this application, I have illustrated one form of embodiment of my invention, and in which—

Figure 1 shows in transverse section one form of tire as secured to the felly or rim. Fig. 2 is a view similar to Fig. 1, showing a modified form of felly and tire. Fig. 3 shows in section the tire separate. Fig. 4 shows a wheel in broken perspective with my form of tire attached. Figs. 5 and 6 show means for assembling the tire. Figs. 7, 8, 9, 10, and 11 show sections of modifications of my tire, and Figs. 12 and 13 show the securing-band.

In the form shown in Figs. 1 and 3 the tire A, composed, preferably, of soft rubber, is made of arched form in cross-section and has a circumferential or annular projection $a$ on the inner wall of the arch on each side. These projections preferably extend to within a short distance of each other. Immediately above each projection $a$ I form an annular groove $a^2$, the lower wall of which is flush with the upper wall of the adjacent projection. The felly of an ordinary automobile, carriage, or a bicycle wheel B has the curved tire-rim C, secured thereto. In order to secure the tire A to this rim, I provide a band D, made of iron, aluminium, wood, or other suitable material, having offset overlapping ends that are slotted at $k^{10}$ and $k^{11}$, as shown in Figs. 12 and 13. This construction permits the band to be put on the wheel loose, and then the projections $a$ are bent down and inserted, first one side and then the other, by a sidewise movement, so that they will be under the band D, as indicated in Fig. 6. Thereupon the bolts E are tightened, which will draw the tire down into the rim C, as shown in Fig. 1. It will be observed that the band binds the projections onto the rim C, and also the band extends into and engages the walls of the grooves $a^2$ in the tire A. Where the band engages the upper wall of the grooves, the band forms a support for the tread of the tire by means of the shoulder-bearing, and thereby effectually resists compression of the tire from the ground and consequent flattening thereof.

In use the compression on a tire is in a vertical line. Therefore a tire having a rounded outer surface when pressure is applied has a tendency to pull away from the outer top edges of the rim and to centralize the pressure, only a portion of the pressure being against the rim, and that is applied at an angle, which would have a tendency to cause the rim to crack or break, and the pressure on the tire, being mostly along one portion, would be more liable to rupture than if the pressure were evenly distributed over the entire rim. In my application I have illustrated a projection A′, constructed to extend beyond the edges of the rim and under pressure to bear directly on the top edges thereof, and thus to evenly distribute the pressure over the entire bearing-faces of the rim and tire. The chief objection to a construction of this kind is that it is liable to chafe and wear. A tire of my construction, being thickened at this portion and formed of wear-resisting materials, is not liable to these objections. These projections are arranged above the plane of the retaining-band D, so that when pressure is applied to the outer face of the tire and the central portion is compressed the pressure will be uniform over the entire bearing-surfaces of the tire and rim, thus affording a wide base and lessening the pressure on any one portion of the tire or rim, whereby danger of break or rupture is lessened.

In Fig. 2 is shown a metal crescent-shaped felly or rim F. For this form of rim the projections $g$ of the tire G are made convex on the rim-engaging side, thereby giving a wedge shape to these projections.

To facilitate the assembling of the tire, I provide an assembling-ring H, made crescent-form, as shown in Figs. 5 and 6. This ring is broken and has a transverse lug $h$ at each end, that has an aperture $h^2$. A bolt $h^3$ passes through these lugs and has a headed nut $h^4$. This ring H is put around the tire, as shown in Fig. 6, and then the head screwed up to bring the lugs together, which will bring the tire down onto the rim.

In the form shown in Fig. 7 the felly K may be of any desired form—for instance, the usual form of felly used on carriages. The flat band-tire $k$ may be the usual flat wagon-tire, but is made narrower than the felly K. The band $k$ is fastened to the rim by bolts $k^2$, having the nuts $k^3$ on the inside of the felly. In the form shown in Fig. 7 the felly K has cut-away portions or grooves $k^{4\times}$. The band $k$ has its edges $k^4$ $k^4$ overhanging the grooves $k^{4\times}$ on each side. The tread member or tire member $k^5$, that is preferably made of rubber, has a channel $k^6$ opposite the middle portion of the band $k$, thus giving it an arched form. The tire has annular hooked portions $k^7$ $k^7$ on each side that engage the free overhanging edges of the band. The band $k$ has overlapping ends $k^8$ $k^9$, containing slots $k^{10}$ $k^{11}$, at which portion the ends are secured by one of the bolts $k^2$. In putting on the tire or clamp-band $k^5$ all of the bolts are loosened and the band raised a short distance from the rim, whereupon the hooked portions of the tire are inserted under the edges of the band. Then the nuts $k^3$ on the bolts $k^2$ are tightened up, the bolt passing through the ends of the band $k^5$ being tightened last, so as to permit the band expanding and contracting in its circumference. Upon the band $k$ being forced onto the felly the hook portions $k^7$ $k^7$ will be tightly clamped between the overhanging portions of the band and the grooves $k^{4\times}$. The ledges $k^{12}$ $k^{12}$ of the felly at the outside of the grooves retain the said hook members in the grooves. When it is desired to remove the tire for any purpose, it is only necessary to loosen up the bolts $k^2$, when the tire $k^5$ can readily be removed and replaced or a new one substituted.

In the form shown in Fig. 8 the felly M has cut-away portions $m$ $m$ and flat rings $m^2$ $m^2$, secured to the felly M by bolts or screws $m^4$ $m^4$, which serve to retain the hook portions of the tire in engagement with the overhanging edges of the band $m^5$.

Another modification is shown in Fig. 9, in which the felly N has rabbet portions $n^2$ $n^3$, and the band $n^4$ overhangs these portions. Flat rings $n^5$ on each side retain the hook portion of the tire in engagement with the edges of the band $n^4$, the faces of the bands engaging the tires having ridges or corrugations that engage corresponding corrugations in the tire to assist in keeping the tire in place. The rings $n^5$ are held in place by bolts or screws $n^6$, that pass through apertures in the hook portions and then into the felly, thus affording additional securing means for the tire.

The rubber tire used in these several forms may have layers of canvas or other fabric or threads L at its securing portions, as indicated by broken lines in Figs. 3 and 9.

In Fig. 10 is shown a form similar to that shown in Fig. 9; but the side ring O has an annular portion $O^2$, that engages a rib or projection $O^3$ on each side of the tire to assist in retaining the tire in place.

Another modification is illustrated in Fig. 11, similar to Fig. 7, in which the band $k$ has the edges $k^{12}$ $k^{12}$ bent downward and forced into the hook portions of the tire, thus holding these portions very securely in the grooves.

Where the felly is made of wood or of material other than metal, I find it advantageous to shrink on the rim in the usual manner an endless band R, of the same width as the flat periphery of the felly, as shown in Fig. 7, secured by suitable bolts $r$. Then the tire-retaining band is secured on this endless band by bolts passing through both bands and the felly or rim.

Without limiting myself to the construction and arrangement hereinbefore set forth, what I claim as new, and desire to secure by Letters Patent, is—

1. The combination of a vehicle-tire composed of resilient material, having an arched form in transverse section and an annular opening therein, annular projections on its under side, annular grooves arranged adjacent to the projections, a felly, means to secure the tire to the felly by the projections, and thickened, annular projections on its outer walls, substantially as described.

2. The combination of a vehicle-tire composed of resilient material reinforced by a fabric, having an arched form in transverse section and an annular opening therein, annular projections on its under side, annular grooves arranged adjacent to and outside of the projections, a felly having walls formed at an angle to the face thereof, means to secure the tire to the felly, and thickened, annular projections on the outer walls of the tire arranged above the plane of the securing projections, substantially as described.

3. The combination in a tire, of a felly, a flat annular band secured to the periphery of the felly, the felly having annular cut-away portions under the edges of the band, an annular member of resilient material having projections arranged to engage the edges of the band and also to engage the felly at said cut-away portions, and annular portions secured to the felly and having ridges arranged to engage the tread member and retain its projections in engagement with the edges of the band, the tread member having corrugations arranged to engage said ridges, substantially as described.

4. The combination in a tire, of a felly, a flat annular band secured to the periphery of the felly, the felly having annular cut-away portions under the edges of the band, an annular member of resilient material having projections arranged to engage the edges of the band and also to engage the felly at said cut-away portions, and annular clamp member secured to the felly by bolts or the like passing through the tread member and into the felly, substantially as described.

5. The combination in a tire, of a felly, a flat annular endless band engaging the periphery of the felly, a second annular clamping-band projecting beyond the said band on each side, means for securing the said bands in position, the felly having annular cut-away portions under the projecting edges of the clamp-band, and an annular tread member of resilient material having projections arranged to engage the edges of said clamp-band, and also to engage the felly at said cut-away portions, substantially as described.

6. The combination of a vehicle-tire composed of resilient material, and having an annular flange on the rim-engaging side, a projection on each flange that extends toward each other, a felly, an apertured band having overlapping slotted ends arranged to engage the said projections, and bolts arranged to secure the band to the felly at said apertured and slotted portions and thereby secure the tire to the felly, substantially as described.

In testimony whereof I affix my signature in the presence of two subscribing witnesses.

WILLIAM E. ANDREW.

Witnesses:
Wm. H. Reid,
E. T. Brandenburg.